United States Patent
Denning

[15] 3,677,501
[45] July 18, 1972

[54] JET PROPULSION POWER PLANT
[72] Inventor: Ralph Murch Denning, Bristol, England
[73] Assignee: Rolls-Royce Limited
[22] Filed: March 9, 1970
[21] Appl. No.: 17,852

[30] Foreign Application Priority Data

March 8, 1969 Great Britain.....................12,338/69
March 8, 1969 Great Britain.....................12,339/69

[52] U.S. Cl..............................244/12 B, 244/1 N, 244/55
[51] Int. Cl......................................B64c 15/06, B64c 15/14
[58] Field of Search .................................244/12, 23, 42, 53

[56] References Cited

UNITED STATES PATENTS

| | | | |
|---|---|---|---|
| 3,332,644 | 7/1967 | Whittley | 244/42 CC |
| 3,482,804 | 12/1969 | Pyptiuk | 244/12 B |
| 3,240,445 | 3/1966 | Ellzey | 244/42 |
| 3,178,887 | 4/1965 | Wilde et al. | 244/23 D |
| 2,945,641 | 7/1960 | Pribram | 244/12 B |
| 3,161,374 | 12/1964 | Allred et al. | 244/12 B |

Primary Examiner—Milton Buchler
Attorney—Mawhinney & Mawhinney

[57] ABSTRACT

This disclosure pertains to a jet propulsion power plant comprising a gas turbine engine having a first exhaust nozzle whose noise level is kept low by a relatively low pressure/area ratio at the nozzle, and having a plurality of second exhaust nozzles whose noise level is kept low by a pressure/area ratio of the individual nozzles which is sufficiently high to cause the peak of the noise spectrum to be of ultrasonic frequency.

6 Claims, 9 Drawing Figures

Patented July 18, 1972

JET PROPULSION POWER PLANT

This invention relates to jet propulsion power plant for aircraft and has for its general object to provide improvements in noise suppression means for such plant.

The acoustic frequency of the exhaust jet in a jet propulsion power plant is a function of the jet velocity and the cross-sectional area of the nozzle through which the jet exhausts, the frequency increasing with velocity and decreasing with area. The higher the acoustic frequency the greater the attenuation of the noise by the environment and the more nearly will the noise be to the limits of audibility.

Attempts have been made to reduce the noise of a propulsion jet by modifying the nozzle so as to increase the noise frequency to a point where there is a high rate of attenuation or even inaudibility. This was done by causing the jet flow, which normally issues from a single nozzle, to issue through a plurality of smaller nozzles. However, it has been found that the exhaust of a conventional jet engine, i.e. an engine comprising in flow series a compressor, a combustor, a turbine and a nozzle, does not have sufficient pressure to make it possible to drive the flow through nozzles of sufficiently small area at sufficiently high velocities to obtain a useful degree of noise reduction without unacceptably high efficiency losses or size penalties. It is one object of this invention to reduce or overcome this difficulty.

According to this invention there is provided a jet propulsion power plant for aircraft, comprising a duct containing in flow-series a compressor, a combustor, a turbine connected to drive the compressor, and a first nozzle, and further comprising a second duct connected to the first duct to be fed with pressure fluid therefrom, and terminating in a plurality of second nozzles, characterized in that the second duct is connected to the first duct at a point where pressure is sufficiently high in relation to the individual second nozzles to produce from the second nozzles a jet flow the noise spectrum of which has its peak at an ultrasonic frequency.

Preferably the second nozzles are arranged in at least one row to provide access for ambient air to these nozzles and to reduce the frontal area of the power plant.

The invention is suitable for aircraft capable of vertical or short aircraft take-off and landing, and in this connection a row of downwardly directed second nozzles may be arranged to lie in the direction of the axis of the compressor and turbine, and in a position downstream of the first nozzle and offset from the flow path of the jet therefrom.

It is intended that sound waves of frequencies in the region of 16,000 cycles per second should be considered to belong to the ultrasonic range of frequencies.

An example of a power plant according to this invention will now be described with reference to the accompanying drawings wherein.

Figure 1:
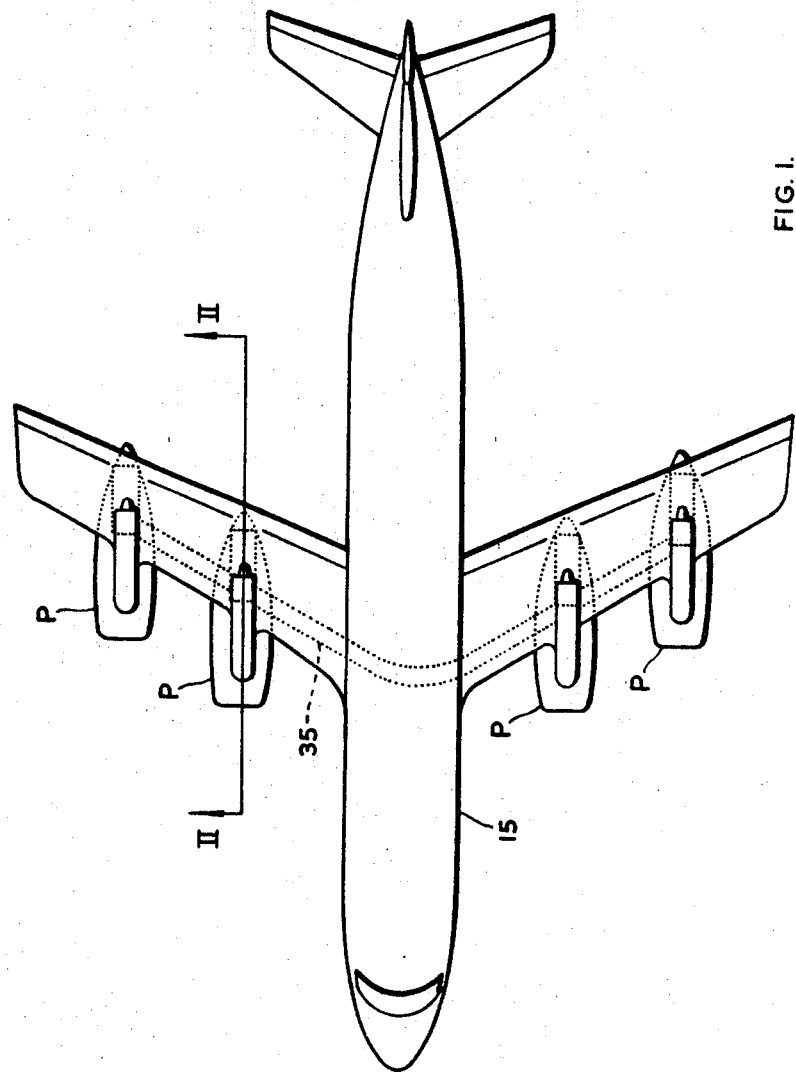
FIG. 1 is a plan view of an aircraft including four such power plants.

Referring to FIGS. 1 to 7, the power plant generally denoted P comprises an engine E including a flow duct 10 containing in flow-series a compressor 11, a combustor 12, a turbine 13 is connected to drive the compressor, and a primary jet nozzle N1. The nozzle N1 is directed rearwards in respect of an aircraft 15 (FIG. 1) in which the plant is installed and a hood 16 is provided for deflecting the exhaust of the nozzle downwards when required.

Only a part of the output of the compressor 11 is led to the combustor 12. The remainder of that output is taken off by a flow splitter 20 to a by-pass duct 21 connectable by valves 22 alternatively to a branch duct 23 terminating in a rearwardly directed nozzle 24 and to a branch duct 25 terminating in a plurality of downwardly directed secondary nozzles N2.

The nozzles N2 are arranged in two rows (FIG. 3) lying parallel to the axis of the compressor and turbine and behind and above the nozzle N1. Such an arrangement provides a low frontal area for the power plant and generally makes it possible to arrange the large number of nozzles N2 in a manner allowing the ambient air access to the individual nozzles for the purpose of being induced into the jet flows thereof to contribute to the noise reduction process.

Figure 6:
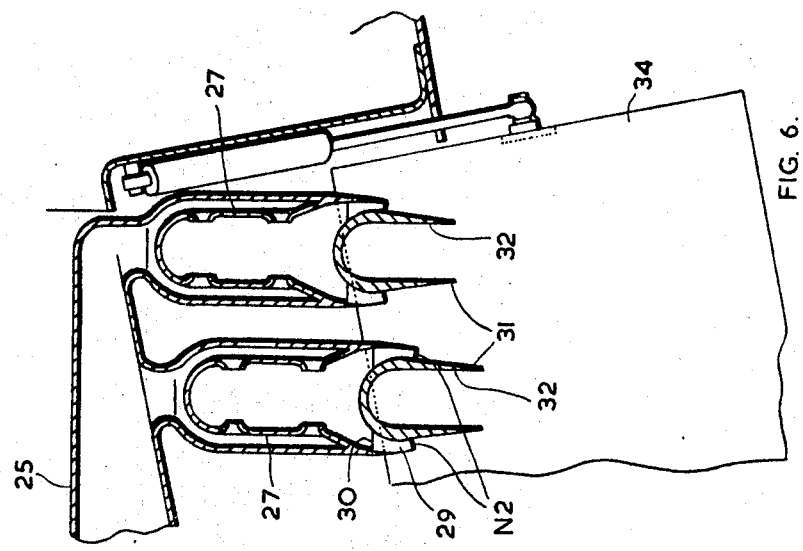
FIG. 6 is a section on the line VI—VI in FIG. 5.
Figure 5:
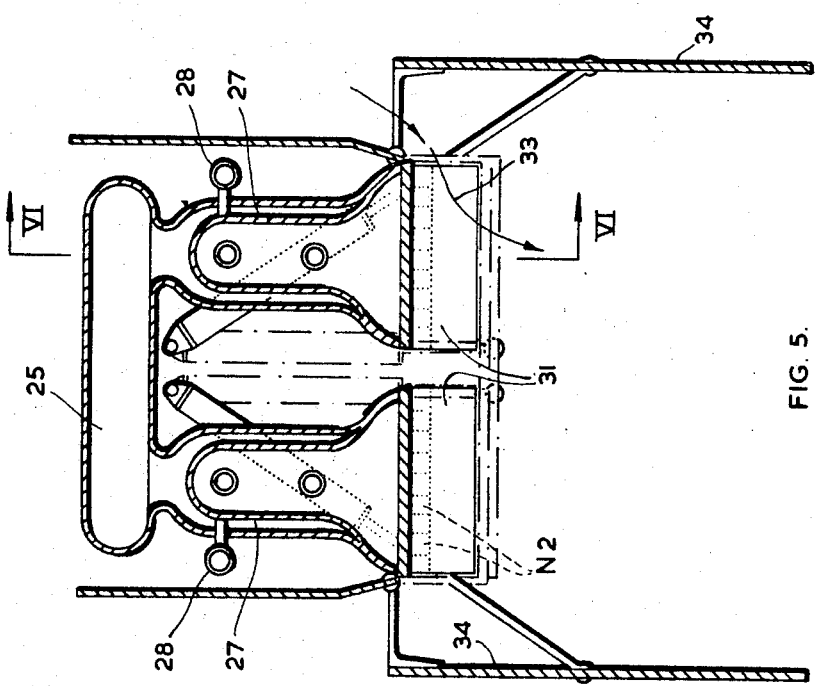
FIG. 5 is an enlarged section on the line V—V in FIG. 2.

As shown in FIGS. 5, 6, the flow connection between the duct 25 and the nozzles N2 includes combustion chambers 27 having fuel supply means 28 for heating the flow to the nozzles N2. The flow from the combustion chambers 27 is divided by a rectangular center body 31 into rectangular openings 29 which are sub-divided by flow splitters 30, and the actual area of one nozzle N2 is the area of an opening 29 between two such splitters or between the end of the opening and the nearest splitter.

The center bodies are hollow and each define a passage 32 for the induction ambient air as shown by arrows 33.

Figure 2:
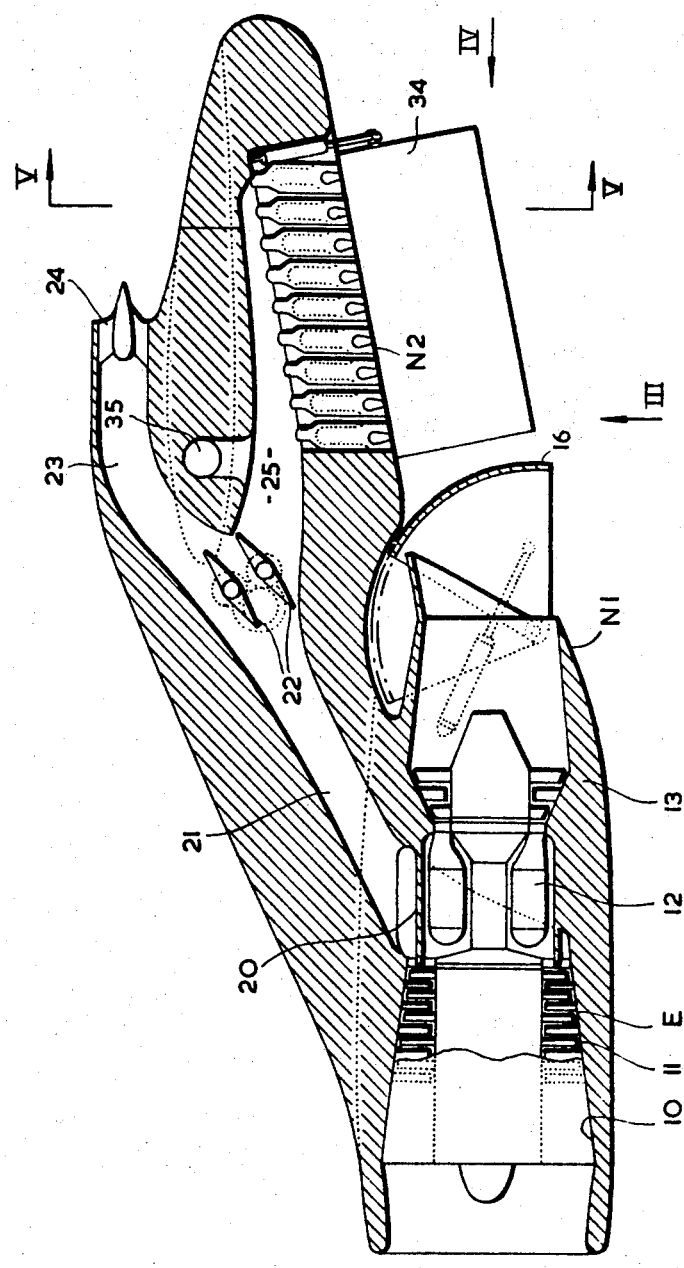
FIG. 2 is an enlarged section on the line II—II in FIG. 1.
Figure 3:
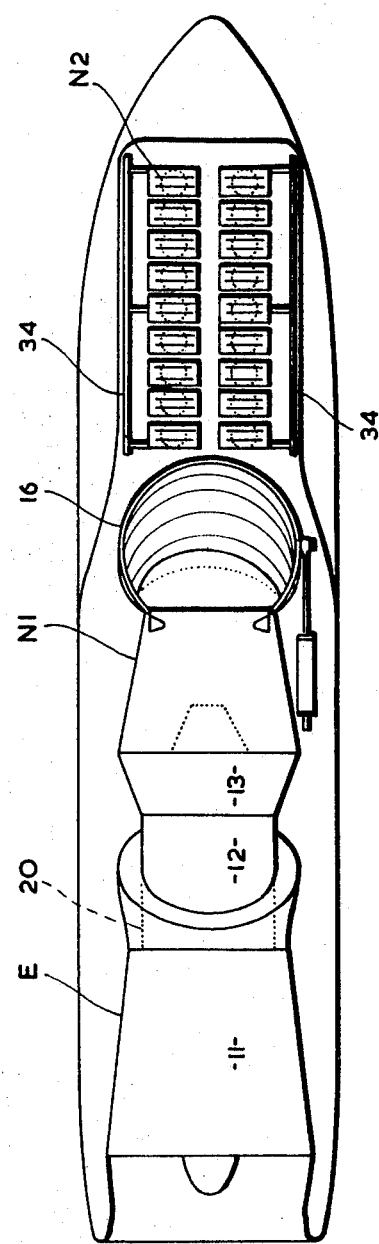
FIG. 3 is a view in the direction of the arrow III in FIG. 2.
Figures 4, 7:
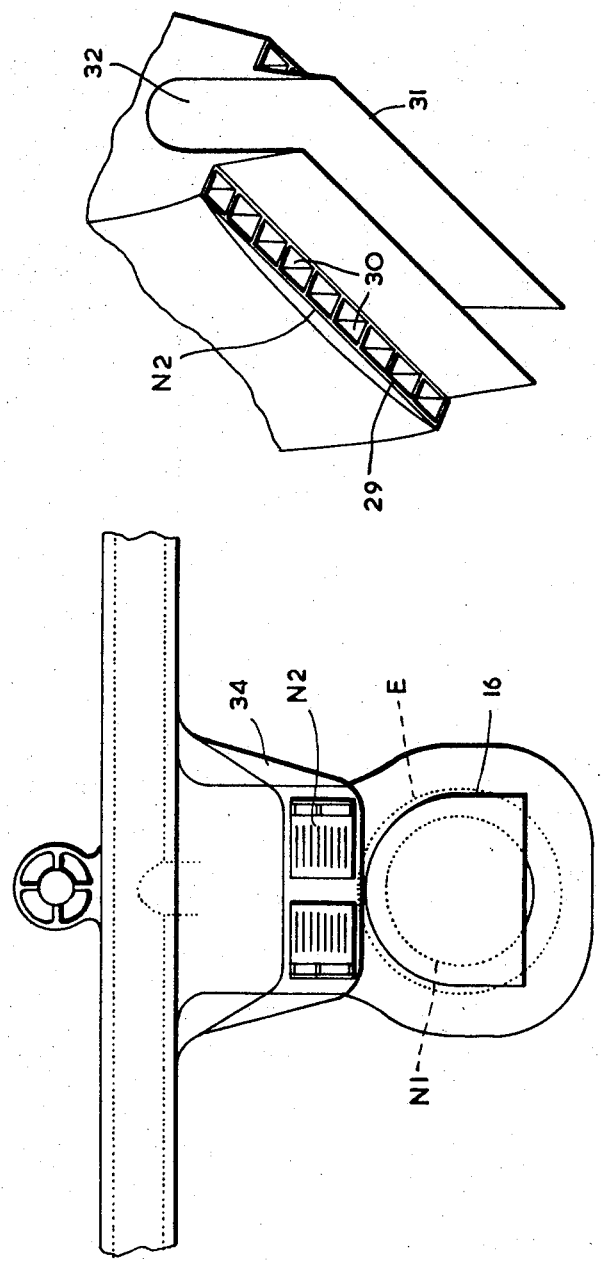
FIG. 4 is a view in the direction of arrow IV in FIG. 2.
FIG. 7 is a perspective view of a detail of FIGS. 5 and 6.

The space below the nozzles N2 is shielded by retractable flaps 34 against the spread of noise from the rather wide noise front presented by the arrangement of the nozzles as seen in FIG. 2.

As shown in FIG. 1, the aircraft 15 is provided with four power plants P symmetrically spaced about the longitudinal axis of the aircraft. The ducts 25 of the individual plants are connected by a duct 35 so that, when the nozzles N2 are used, failure of the engine in one of the plants will not deprive the nozzles N2 of that plant of a pressure supply.

In operation, for the purpose of vertical take-off, the hood 16, and shields 34 are moved by appropriate actuators into the positions shown in full lines in the drawings. For transition to forward flight the valves 22 are moved to the position shown in full lines to direct the by-pass flow through the branch duct 23.

The engine may be of a single spool or a multi-spool type and the junction to the duct 21 may be arranged where necessary along the compressor or compressors to obtain the desired pressure ratio for the duct 21.

The combustion chambers 27 are not essential in cases where a high pressure ratio is available and only a relatively low thrust is required, and possibly where a sacrifice is acceptable in the power/weight ratio of the engine.

It will be noted that the power plant combines horizontal and vertical thrust capability on the basis of a single engine, and includes the noise reduction facility which is so important for vertical thrust applications.

The division of the plant in such a way that the gas flow is exhausted through one relatively large primary nozzle N1 and a plurality of small secondary nozzles N2 makes it possible to achieve an overall noise reduction not achievable if the whole of the exhaust of the power plant were passed through the nozzle N1. It will be seen (1) that the relatively large turbine pressure ratio necessary to drive a compressor capable of feeding both the combustor 12 and the by-pass 21 makes it possible to depress the jet velocity, and thus the noise, at the nozzle N1 and (2) that the high pressure ratio at which the duct 21 is fed makes it possible to raise the velocity/area ratio and thus the frequency of the jet noise at the nozzles N2 to an extent where a significant proportion of the noise is either atmospherically attenuated or becomes inaudible. The calculations necessary to bring about these conditions are essentially known to those skilled in this art and it is necessary here only to point out those steps which have a particular bearing on this invention.

The calculations start with a known requirement for total thrust in the vertical direction and initial assumptions about the total mass flow required, the by-pass ratio (i.e. the by-pass ratio is dependent on the ratio of the mass flows through the main and the by-pass duct respectively), the pressure and temperature ratios for the main duct, the pressure and temperature ratios for the by-pass duct, and so on.

Separate calculations are then made for the main and the by-pass duct to determine jet velocities, total thrust, specific thrust, specific fuel consumption and noise levels. The two sets of calculations are then compared and if necessary repeated to obtain the best compromise between overall fuel consumption, thrust, weight and so on. This iterative process is well known per se.

In the calculations for the main duct the jet velocity is kept sufficiently low to avoid excessive noise levels and if, in the initial calculation the pressure chosen for the main duct resulted in too high a jet velocity, then the by-pass ratio is lowered to lower the main duct jet velocity. This consideration determines the position along the main duct at which the flow is divided, i.e. if a lower pressure ratio is required for the main duct, the junction with the by-pass duct is selected to lie further upstream along the compressor, and vice versa. A typical figure for a jet velocity for the main duct is 950 ft/sec.

In the calculations for the by-pass duct the aim is not low but high jet velocity and a set of typical figures is now described by way of example.

Assuming a by-pass pressure ratio of 15:1 and a nozzle entry temperature of 1,000°K, the calculable jet velocity is about 3,500 ft/sec. At this velocity a mass flow giving a thrust of 20,000 lbs. requires a calculation total nozzle area of 68 square inches. Assuming this to be divided into 346 nozzles of 0.5 inch diameter (about 0.2 square inch area), it is then possible to calculate the frequency at the peak of the noise spectrum from the simple relationships:-

$$\text{Frequency} = \frac{\text{Jet Velocity}}{\text{Nozzle Diameter}} \times \text{Strouhal Number}$$

The term for Strouhal number is approximately 0.8 at the angle of peak noise radiation and the frequency is, in the present example, approximately 16,000 cycles per second which is above the normal range of human hearing.

Figure 8:
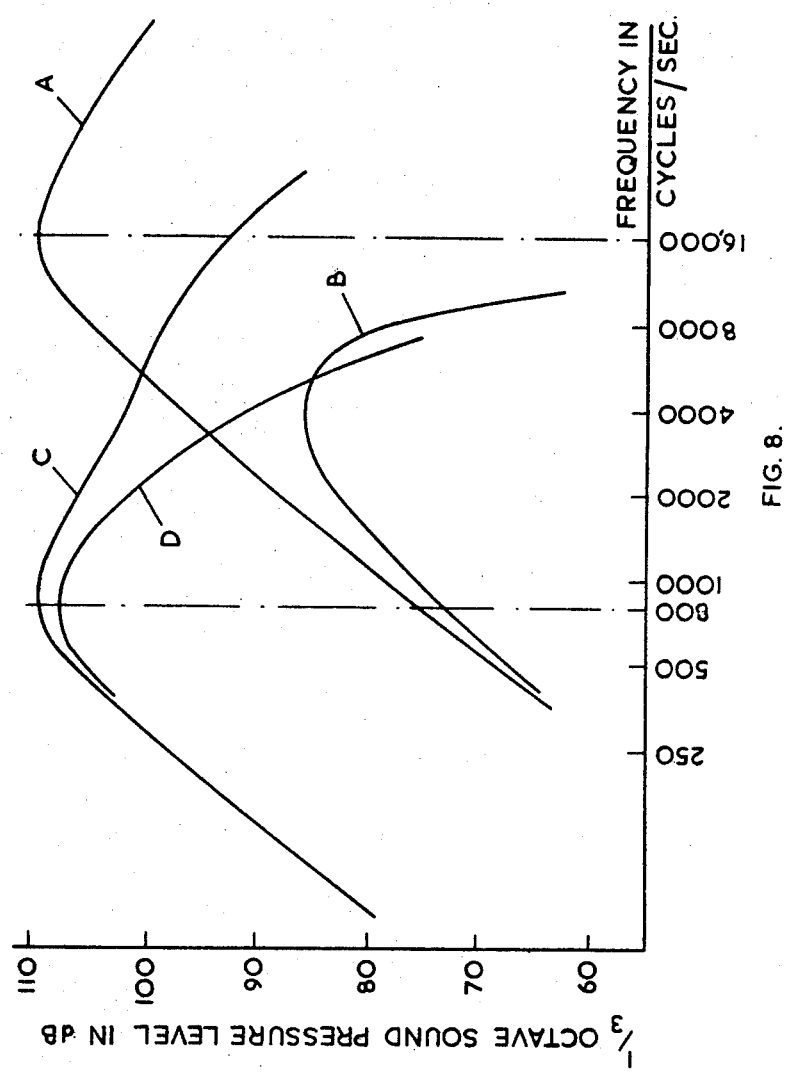
FIG. 8 is a diagram showing jet noise spectra at different stages of attenuation.

FIG. 8 shows at A the uncorrected source noise spectrum for the sound pressure level of the 346 nozzles at 1,500 ft from the point of observation, and at B the same spectrum corrected for atmospheric attenuation. C and D show the corresponding spectrum for a single nozzle of 68 square inch area and demonstrate how although the uncorrected pressure level is the same in both cases (i.e. at A and C), the peak level of the attenuated noise for the 346 nozzles is significantly lower than in the case of the single nozzle.

Figure 9:
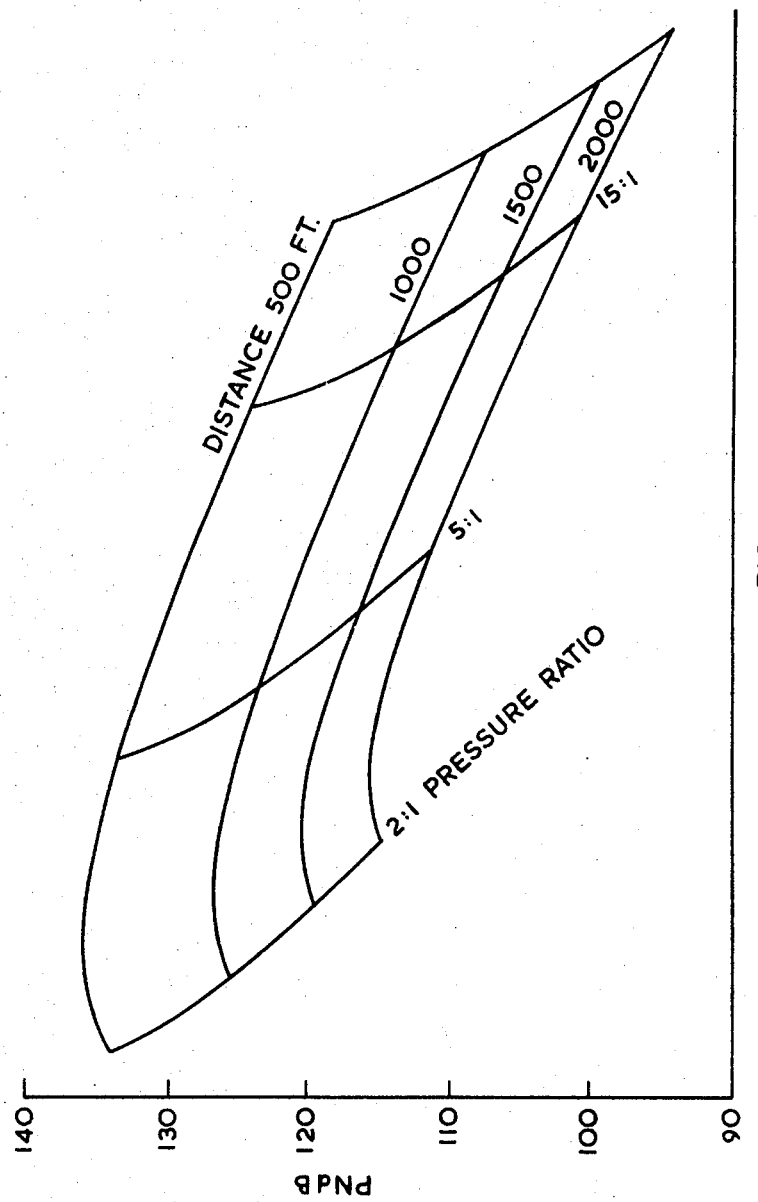
FIG. 9 is a diagram relating jet noise generated at different pressure ratios.

FIG. 9 shows a set of curves showing the effects of changing pressure ratios on the noise produced by the 346 nozzles, together with the effects of distance from source of noise. It will be noted how the noise level rises with reduction in pressure ratio. In other words, unless a relatively high pressure ratio is available, a very large number of very small nozzles would have to be introduced to attain significant noise suppression. It has been found that at pressure ratios below 5:1 and nozzle areas below 0.2 square inch it is not practicable to seek an improvement of the noise problem by raising the noise frequency. This is partly because the nozzle efficiency itself falls with the increasing preponderance of boundary layer and partly because of problems of practical construction involving a large number of small outlets. Even nozzle areas of the order of 0.2 square inch require special structural organization such as shown in the drawings to make them practicable especially as regards the induction of ambient air.

Just as there are practical limits to the reduction in nozzle area, so there are practical limits to increasing pressure ratio, temperature and jet velocity. The figures mentioned (15:1 for pressure ratio, 1,000°K for temperature and 3,500 ft/sec for jet velocity) are well within the capacity of present-day technology, but with improvements in component design and in refractory materials higher values can be contemplated.

What we claim is:

1. Jet propulsion power plant for aircraft, comprising a duct containing in flow-series a compressor, a combustor, a turbine connected to drive the compressor, and a first primary jet nozzle, and further comprising a second duct connected to the first duct to be fed with pressure fluid therefrom, and terminating in a plurality of secondary jet nozzles, said second duct being connected to the first duct at a point in the vicinity of the compressor where pressure is sufficiently high in relation to the individual secondary nozzles to produce from the secondary nozzles individual and distinct jet flows having a noise spectrum which has its peak at an ultrasonic frequency, said secondary nozzles including a plurality of combustion chambers having an outlet for combustion products and comprising a center body of substantially rectangular form, as seen in the general direction of flow through the outlet, and discharge passages for the combustion products arranged at the long sides of the said form, the center body being hollow and having interior surfaces defining a space open to ambient air at, at least, one of the short sides of said form and at the downstream end of the center body.

2. Power plant according to claim 1 wherein the secondary nozzles are arranged in at least one row.

3. Power plant according to claim 2 wherein the secondary nozzles are arranged to be directed downwardly (in respect of an aircraft), to lie in a row extending in the direction of the axis of said compressor and turbine, and to be situated downstream of the first nozzle off-set from the flow path of the jet therefrom.

4. Power plant according to claim 3 comprising means for deflecting the jet flow of the first nozzle from a rearward direction (in respect of an aircraft) into a direction having a downward component.

5. Power plant according to claim 2 comprising a retractable shield arranged parallel to the length of the row and downstream of the secondary nozzles in a position to inhibit the spread of jet noise laterally in respect of the row.

6. Power plant according to claim 1 comprising a third duct connected to the secondary duct at a point between the first duct and the second nozzles, a third nozzle connected to the third duct and valve means for diverting the flow in the second duct to by-pass the secondary nozzles and to be discharged through the third nozzle.

* * * * *